May 1, 1962 E. KAFIG ETAL 3,031,930
THIN REPLACEABLE BACK SURFACE MIRROR AND HOLDERS
Filed May 5, 1959

INVENTORS
Emanuel Kafig
Raymond L. Long
BY
ATTORNEYS

United States Patent Office 3,031,930
Patented May 1, 1962

3,031,930
THIN REPLACEABLE BACK SURFACE MIRROR AND HOLDERS
Emanuel Kafig, 411 Gilmoure Drive, Silver Spring, Md., and Raymond L. Long, 11024 Chandler Road, Bethesda, Md.
Filed May 5, 1959, Ser. No. 811,230
3 Claims. (Cl. 88—104)
(Granted under Title 35, U.S. Code (1952), sec. 266)

The invention described herein may be manufactured and used by or for the Government of the United States of America for governmental purposes without the payment of any royalties thereon or therefor.

The present invention relates to dental mirrors and more particularly to a dental mirror wherein the mirror is removably retained in a holder by a permanent magnet.

Dental mirrors are subject to damage during use such, for example, as scratching of the surface by dental instruments and breakage by dropping or other causes. In prior art mirrors wherein the glass mirror, the holder and the shank are made up as a unit, the entire unit must be replaced when such damage occurs. Thus the undamaged holder and shank must be discarded when the only damage is to the glass mirror. This greatly increases the cost of replacement over merely replacing the glass element.

In other prior art dental mirrors, the glass mirrors are removable from the holders. Generally these mirrors are characterized by a plurality of parts held together by bezels, spring clamps and the like and require difficult and time-consuming operations to remove the damaged mirror and install a new one.

The dental mirror of the present invention, however, is provided with a mirror assembly which includes a glass element having the back coated with a reflective coating, and a magnetic metal disc which is cemented to the back of the glass element. A metal holder is provided which is a permanent magnet, the mirror assembly being held in a recess in the holder by magnetic attraction. Conversely, the metal disc of the mirror may be a permanent magnet and the holder may be of magnetic material. In order to remove the mirror assembly, an opening is provided in the back of the holder for entry of a suitable instrument to push the mirror assembly away from the permanent magnet holder. Thus the removal is accomplished quickly, easily and economically, with only the mirror assembly being discarded, the holder and shank being retained. A new mirror assembly is easily dropped into the recess of the holder where it is firmly held by magnetic attraction until it is again necessary to remove it.

An object of the present invention is to provide a dental mirror wherein the mirror is easily and inexpensively replaced in case of damage.

Another object is to provide a dental mirror wherein the mirror is magnetically retained in its holder.

Still another object is to provide a thin glass back-surface mirror wherein the mirror is substantially free of double images.

A further object is to provide a dental mirror wherein the balance thereof is not changed by replacement of the metal-backed mirror.

Other objects and many of the attendant advantages of this invention will be readily appreciated as the same becomes better understood by reference to the following detailed description when considered in connection with the accompanying drawings wherein.

Figure 1:
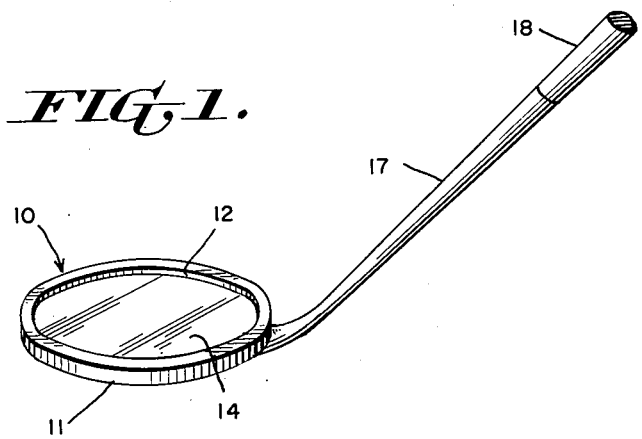
FIG. 1 is a perspective view of an embodiment of the mirror of the present invention.
Figure 2:
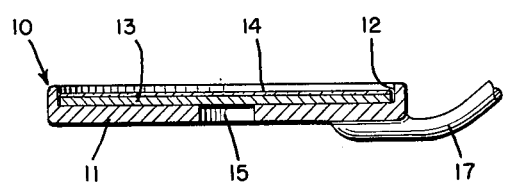
FIG. 2 is a vertical sectional view thereof.
Figure 3:
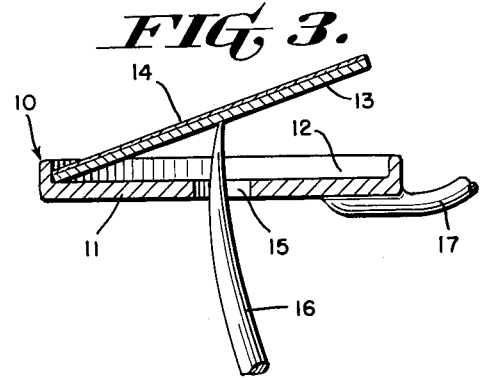
FIG. 3 is a view similar to FIG. 2 showing the mirror being removed.

Referring more particularly to the drawings wherein like numerals indicate like parts throughout the several views, 10 indicates generally the dental mirror of FIGS. 1, 2 and 3. The dental mirror 10 comprises a circular holder 11 of permanently magnetized material having a circular or other suitably shaped recess 12 for the reception of a metal disc of magnetic material 13 which is provided with a protective coating. A thin glass mirror 14, having the usual reflective backing (not shown), is cemented to the disc 13. A central opening 15 is formed in the holder 11 for permitting the insertion of a suitable instrument 16 to separate the disc 13 and mirror 14 from the holder 11.

A shank 17 is brazed or otherwise secured to the periphery of the holder 11 and a handle 18 may be threadedly secured to the shank in the usual manner.

From the foregoing it is apparent that a dental mirror has been provided wherein the disc and mirror assembly 13, 14 may be readily removed from the holder 11, in case of damage to the mirror, by inserting an instrument 16 into opening 15 and pressing against disc 13, thus forcing the mirror and disc out of the recess 12 provided in the holder 11. A new mirror and disc assembly may then be dropped into recess 12, the magnetic holder 11 securely holding the new assembly in place.

Figure 4:
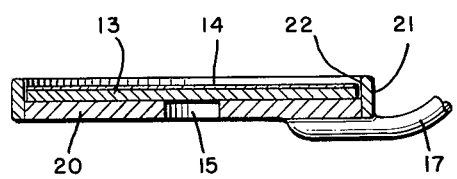
FIGS. 4 and 5 are sectional views of slight modifications of the present invention.

FIG. 4 shows a slight modification of the device of the present invention wherein the holder comprises a disc 20 of permanent magnet material having the opening 15 centered therein. A rim 21 is brazed, or otherwise secured to the periphery of disc 20 and extends upwardly therefrom to form recess 22 corresponding to recess 12 of FIGS. 1, 2 and 3. The mirror and disc assembly is magnetically held in recess 22 and may be readily removed by insertion of instrument 16 in opening 15 as hereinbefore set forth in the description of the device shown in FIGS. 1, 2 and 3.

Figure 5:
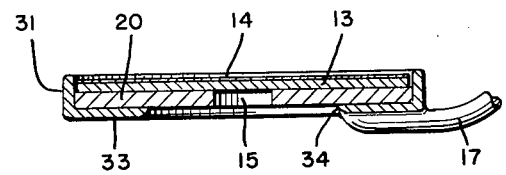

FIG. 5 shows a further modification of the dental mirror of the present invention wherein the permanent magnet disc 20 for magnetically securing disc and mirror assembly 13, 14 is provided with a rim 31 having a flange 33 extending inwardly a short distance toward the center of disc 20, the flange being secured by suitable well-known means, such as by brazing, to the bottom of the disc. The opening 15 in disc 20 communicates with a larger opening 34 defined by the flange 33 permitting insertion of the instrument for removing the disc and mirror assembly. A shank 17 is secured to rim 31 and flange 33.

While disc 13 has been described as being of magnetic material, that is, capable of being used as an armature for the magnetized holder 11 or disc 20, it is also within the province of this invention to reverse these parts by magnetizing the disc 13 or making it of permanent magnetic material while making holder or disc 11 and 20 of magnetic material.

As shown in the drawings, the mirror 14 is formed of extremely thin glass, for example, a thickness of .002", having a reflective backing and being cemented to the disc 13. The mirror and magnetic disc thus have no more thickness than that of the conventional thick glass mirror. The use of a thin-glass mirror has also been found advantageous in that the small distance between the outer surface of the glass and the reflecting surface provides a clear image without noticeable double reflection. Thus the mirror provides an image comparable to that of a front reflecting surface mirror with the additional benefit of the protection of a thin glass surface for the reflecting surface.

In all forms of the invention the rim at the periphery of the holder extends slightly above the outer surface of the mirror assembly to protect the mirror against accidental displacement and damage to the edge of the glass.

While the foregoing description of the invention applies primarily to a back surface mirror, the invention may employ a front surface mirror if desired. In this case, the thin glass mirror 14 is cemented to the disc 13 in such a manner that the reflective coating on the mirror is exposed. That is, the cement is applied between the glass of the mirror 14 and the disc 13 of magnetic material, instead of being applied between the reflective coating of the mirror and said disc. The advantages of a front surface mirror are well known, and this invention makes it possible to assemble the mirror inexpensively and to replace it easily.

Any metal having a high degree of reflectivity and capable of being applied to the glass may be used in constructing the mirror of this invention which may be used as either a front surface or a back surface mirror. Also while the mirror assembly has been described as including a metal disc to provide the desired magnetic characteristics, other methods can be employed to give the mirror assembly these characteristics. For example, a magnetic material dispersed in a carrier may be painted or sprayed onto the glass mirror.

Obviously many modifications and variations of the present invention are possible in the light of the above teachings. It is therefore to be understood that within the scope of the appended clams the invention may be practiced otherwise than as specifically described.

What is claimed is:

1. A dental holder of magnetized material having a recess therein, a handle secured to said holder, a thin glass mirror of such thickness as to substantially reduce the reflection of a double image, a magnetic disc permanently secured to the back of said mirror, said mirror and said disc being magneticaly held within said recessed holder, said recessed holder having an opening providing access to said disc whereby the disc and mirror may be forced out of said recessed holder.

2. A dental mirror structure comprising a magnetized mirror holder of generally flattened cylindrical shape having a cylindrical recess in one end, a mirror assembly comprising a thin circular back surface mirror affixed to a disc of magnetic material, said mirror being of such thickness as to substantially reduce the reflection of a double image, said mirror being retained within said recess by magnetic attraction between said holder and assembly for easy removal.

3. A dental mirror comprising, a holder of permanent magnet material having a recess therein, a handle secured to said holder, a thin glass mirror of such thickness as to substantially reduce the reflection of a double image, a disc of magnetic material secured to the back of said mirror, the size of said mirror and said disc being such that they fit completely within said recess to be held magnetically in said holder for easy removal.

References Cited in the file of this patent

UNITED STATES PATENTS

| | | |
|---|---|---|
| 425,768 | Ezell | Apr. 15, 1890 |
| 528,163 | Hitchcock | Oct. 30, 1894 |
| 1,909,853 | Dalton | May 16, 1933 |
| 2,192,103 | Preston | Feb. 27, 1940 |
| 2,352,976 | Schaefer | July 4, 1944 |
| 2,693,382 | Teetor | Nov. 2, 1954 |
| 2,752,764 | Lederer | July 3, 1956 |
| 2,812,203 | Scholten | Nov. 5, 1957 |
| 2,935,662 | Hausman | May 3, 1960 |

FOREIGN PATENTS

| | | |
|---|---|---|
| 279,780 | Switzerland | Jan. 4, 1954 |